US011893878B1

(12) United States Patent
Burau et al.

(10) Patent No.: US 11,893,878 B1
(45) Date of Patent: Feb. 6, 2024

(54) ALERT GENERATION SYSTEM

(71) Applicant: SPARTAN ALERT, LLC, Williston, ND (US)

(72) Inventors: Darin James Burau, Williston, ND (US); Nathan Robertus, Williston, ND (US)

(73) Assignee: Spartan Alert, LLC, Williston, ND (US)

( * ) Notice: Subject to any disclaimer, the term of this patent is extended or adjusted under 35 U.S.C. 154(b) by 28 days.

(21) Appl. No.: 16/787,886

(22) Filed: Feb. 11, 2020

Related U.S. Application Data

(60) Provisional application No. 62/815,058, filed on Mar. 7, 2019.

(51) Int. Cl.

| | |
|---|---|
| ***G08B 27/00*** | (2006.01) |
| ***G08B 7/06*** | (2006.01) |
| ***G08B 21/12*** | (2006.01) |

(52) U.S. Cl.
CPC ............... *G08B 27/00* (2013.01); *G08B 7/06* (2013.01); *G08B 21/12* (2013.01)

(58) Field of Classification Search
CPC ........... G08B 27/00; G08B 7/06; G08B 21/12
See application file for complete search history.

(56) References Cited

U.S. PATENT DOCUMENTS

| | | | | |
|---|---|---|---|---|
| 4,600,980 | A * | 7/1986 | Dahlgren | F21V 21/22 362/385 |
| 2005/0030977 | A1* | 2/2005 | Casey | G08B 27/005 348/E7.078 |
| 2008/0231707 | A1* | 9/2008 | Fontana | G08B 13/19632 348/158 |
| 2010/0302373 | A1* | 12/2010 | Monsive, Jr. | G08B 15/001 348/151 |
| 2018/0089988 | A1* | 3/2018 | Schwarzkopf | G08B 25/10 |

* cited by examiner

*Primary Examiner* — Quan Zhen Wang
*Assistant Examiner* — Rajsheed O Black-Childress
(74) *Attorney, Agent, or Firm* — AVEK IP, LLC

(57) ABSTRACT

An alert generation system includes an alert generating device comprising an audial indicator and a visual indicator at one end. The system further includes a handheld alert generating device comprising a second audial indicator. A computing system is in data communication with the alert generating device and the handheld alert generating device. The computing system sends a signal to the alert generating device and the handheld alert generating device, and the alert generating device activates an alert via at least one of the audial indicator and the visual indicator, in response to the signal. The handheld alert generating device activates a second alert via the second audial indicator, in response to the signal.

19 Claims, 13 Drawing Sheets

ALERT GENERATION SYSTEM

CROSS-REFERENCE TO RELATED APPLICATIONS

This application claims priority to U.S. Provisional Patent Application No. 62/815,058, filed Mar. 7, 2019, the disclosure of which is incorporated by reference herein in its entirety.

FIELD OF THE DISCLOSURE

The disclosure relates generally to the field of alert generation systems and methods. More specifically, the disclosure relates to apparatus and methods for providing an alert across a network of devices.

SUMMARY OF THE INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to one embodiment, an alert generation system includes an alert generating device comprising an audial indicator and a visual indicator at one end. The system further includes a handheld alert generating device comprising a second audial indicator. A computing system is in data communication with the alert generating device and the handheld alert generating device. The computing system sends a signal to the alert generating device and the handheld alert generating device, and the alert generating device activates an alert via at least one of the audial indicator and the visual indicator, in response to the signal. The handheld alert generating device activates a second alert via the second audial indicator, in response to the signal.

According to another embodiment, a method is provided for delivering an alert to a working area. The method includes first driving a mobile alert assembly apparatus to the working area. The mobile alert assembly apparatus includes a housing; a mast rotatably secured to the housing; an alert generating device configured to be temporarily secured to an end of the mast; at least one remote alert generating device temporarily stored inside the housing; and a computing system communicatively coupled to the alert generating device and stored inside the housing, the computing system comprising a processor and memory having instructions for providing an alert to a user via the alert generating device and the remote alert generating device. Upon arrival at the working area, the method continues by removing the alert generating device from the housing and securing the alert generating device to the end of the mast. The mast is then rotated into an operational configuration. The programming determines an alert condition, and sends, via the processor, an alert signal to the alert generating device and the remote generating device. Finally, an alert is activated on at least one of the alert generating device and the remote generating device.

According to still another embodiment, an alert generation system, includes an alert generating device comprising an audial indicator and a visual indicator at one end; and a computing system in data communication with the alert generating device. The computing system is housed in a mobile alert assembly apparatus that has a mast operably connected thereto and configured to rotate between an operational configuration and a storage configuration. The alert generating device is selectively disposed atop the mast. The computing system sends a signal to the alert generating device; and the alert generating device activates an alert via at least one of the audial indicator and the visual indicator, in response to the signal.

BRIEF DESCRIPTION OF THE SEVERAL VIEWS OF THE DRAWINGS

Illustrative embodiments of the invention are described in detail below with reference to the attached drawing figures.

DETAILED DESCRIPTION

Figure 1:
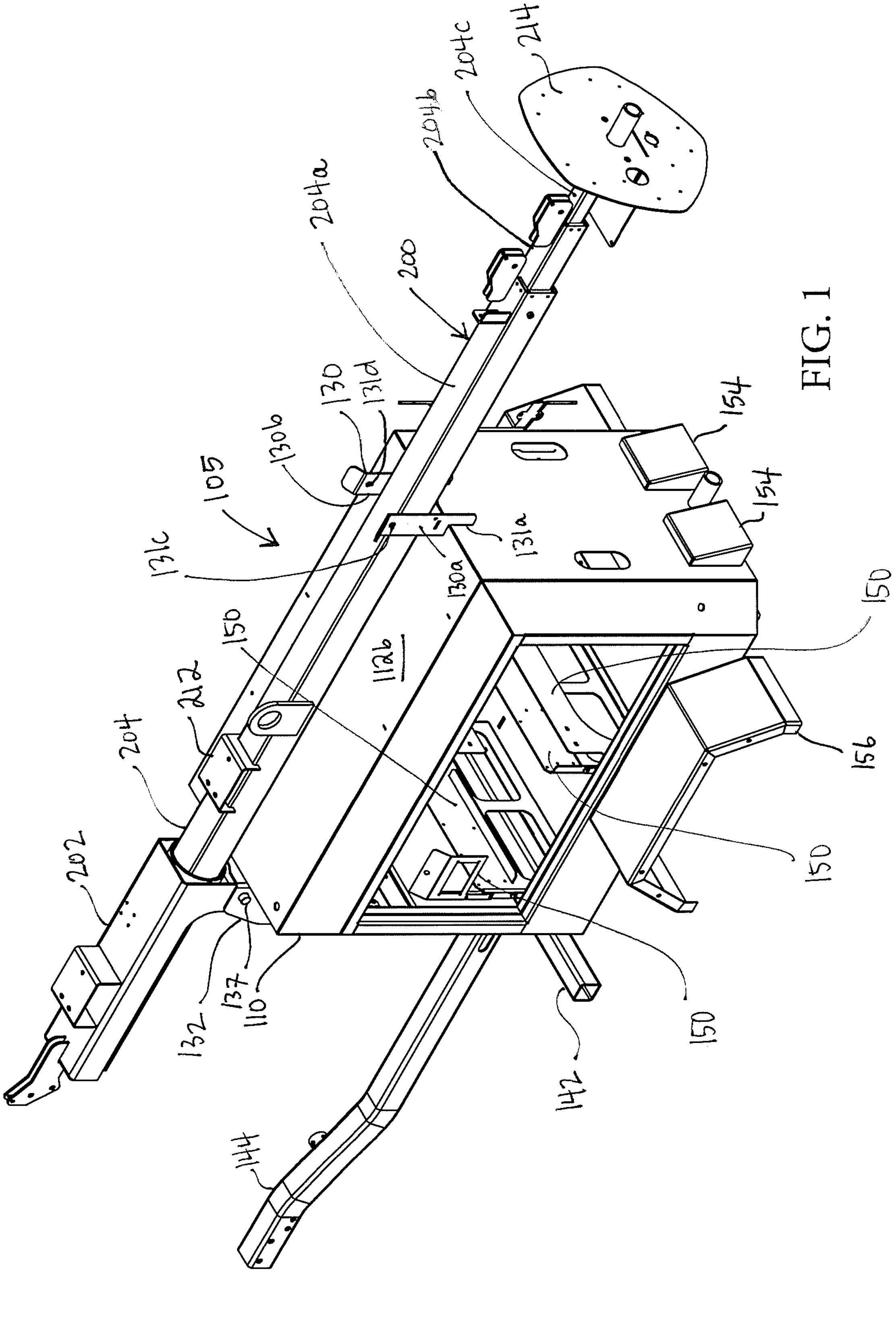
FIG. 1 is a rear perspective view of an alert assembly apparatus of an alert generation system according to embodiments of the invention.

Even with safety precautions in place, dangerous conditions may still arise in all kinds of environments, be it work, home, or recreational. Devices designed to alert nearby persons to the dangerous conditions are ubiquitous. However, many such devices suffer from serious flaws. These flaws are easily magnified when the devices are utilized in areas where background noise is constant and loud, where the devices are permanent fixtures, and/or where the notification area extends over far distances. It would be beneficial to have an alert generation system that is mobile, can be configured to provide alerts over large distances, and that can be relied on in situations where the background noise would otherwise prevent the alert from reaching the intended recipient.

As will be described in greater detail here, embodiments of an alert generation system 100, housed in an alert assembly apparatus 105, may include an alert generating device 300. In embodiments, the system 100 may further include one or more handheld alert generating devices 305. The respective alert generating devices 300 and 305 are communicatively coupled to a computing system 350. In operation, the alert generation system 100 may be used to produce an alert and deliver the alert through the one or more devices 300 and 305.

Referring now to FIGS. 1-7, the alert assembly apparatus 105 includes a main body 110 configured to store the alert generating device 300 when not in use. The alert generating device 300 is supported by a mast assembly 200 which includes a mast mount bracket 202 that operably connects a mast 204 to the main body 110, as will be described in greater detail below.

Figure 4A:
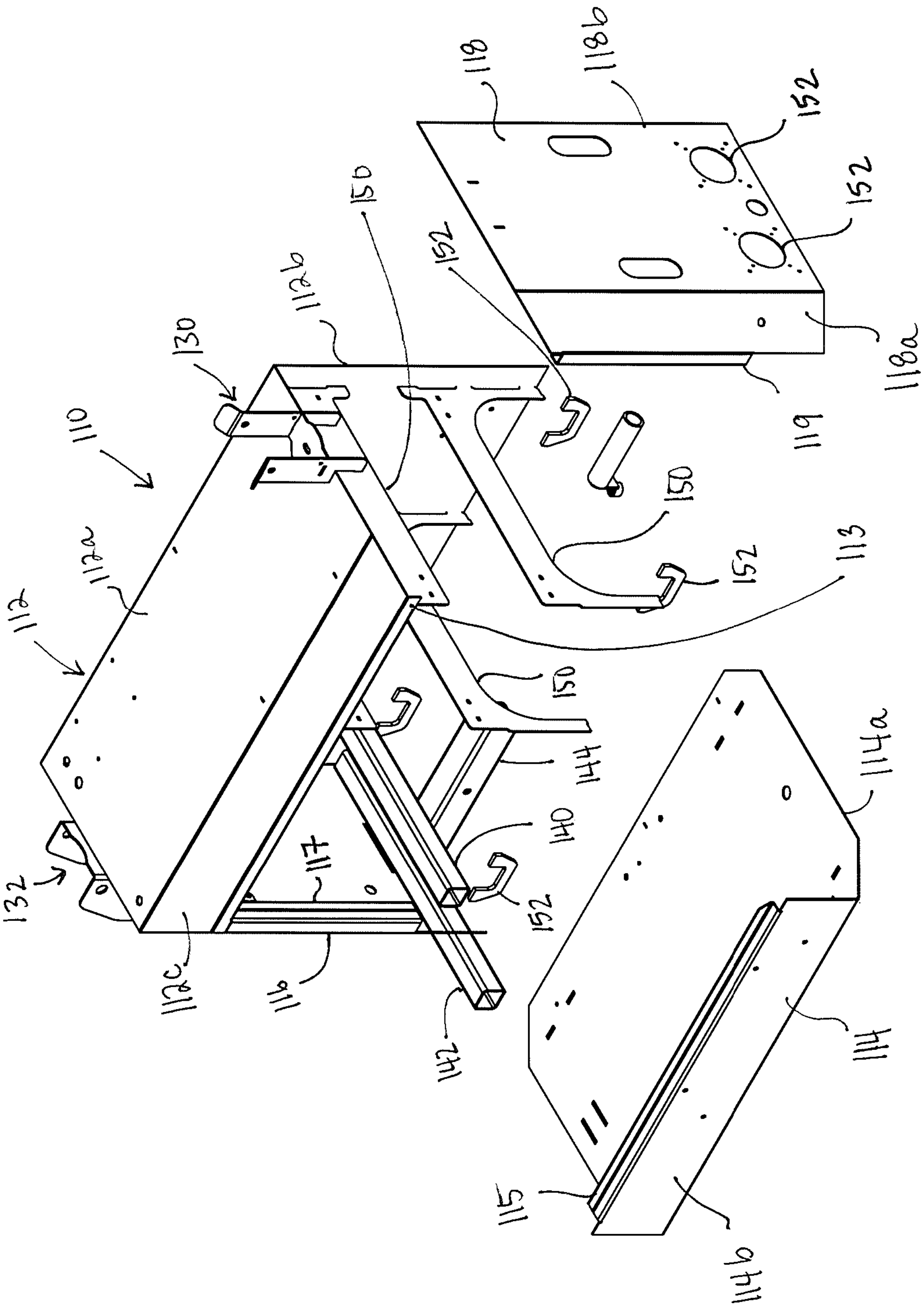
FIG. 4A is an exploded front perspective view of the alert assembly apparatus of FIG. 1.
Figure 4B:
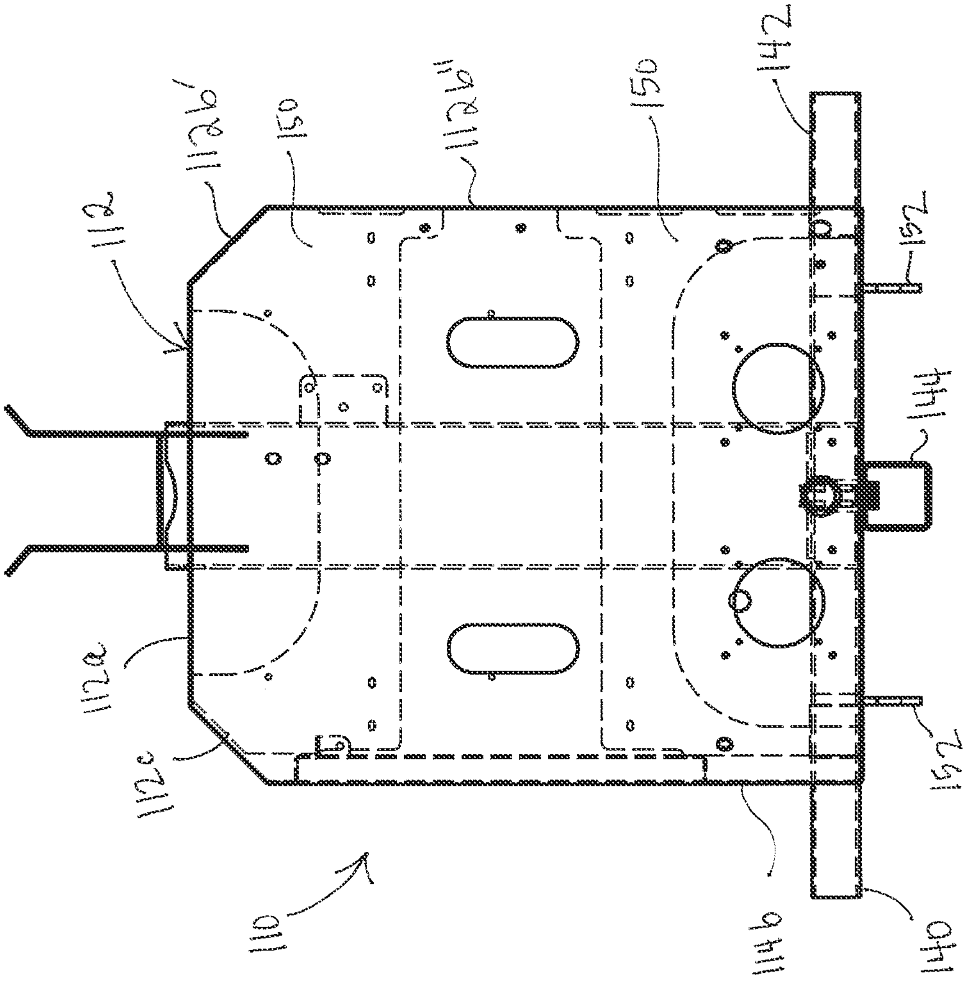
FIG. 4B is a front view of the alert assembly apparatus of FIG. 1.

As shown in FIGS. 4A-B, the main body 110 includes an upper pan 112, a lower pan 114, a front panel 116, and a rear panel 118. The upper pan 112 has a top panel 112*a* and a first side panel 112*b* that extends from a side of the top panel 112*a*. A second side panel 112*c* extends from an opposing side of the top panel 112*a*. In some embodiments, the first side panel 112*b* includes a first angled portion 112*b*' that extends directly from the top panel 112*a*, and a second portion 112*b*" that extends substantially vertically from the first angled portion 112*b*' (FIG. 4B). The first angled portion 112*b*' may be angled from about 0 to about 90 degrees from horizontal. Preferably, the first angled portion 112*b*' is angled from about 0 to about 50 degrees from horizontal. In some embodiments, the first angled portion is angled at about 45 degrees from horizontal. Similarly, the second side panel 112*c* may be angled away from the top panel 112*a* at an angle ranging from about 0 to about 90 degrees from horizontal. Preferably, the second side panel 112*c* may be angled from about 0 to about 50 degrees from horizontal. In some embodiments, the second side panel 112*c* is angled at about 45 degrees from horizontal. The second side panel 112*c* may include a door stop 113 extending from a bottom edge thereof.

Figure 4C:
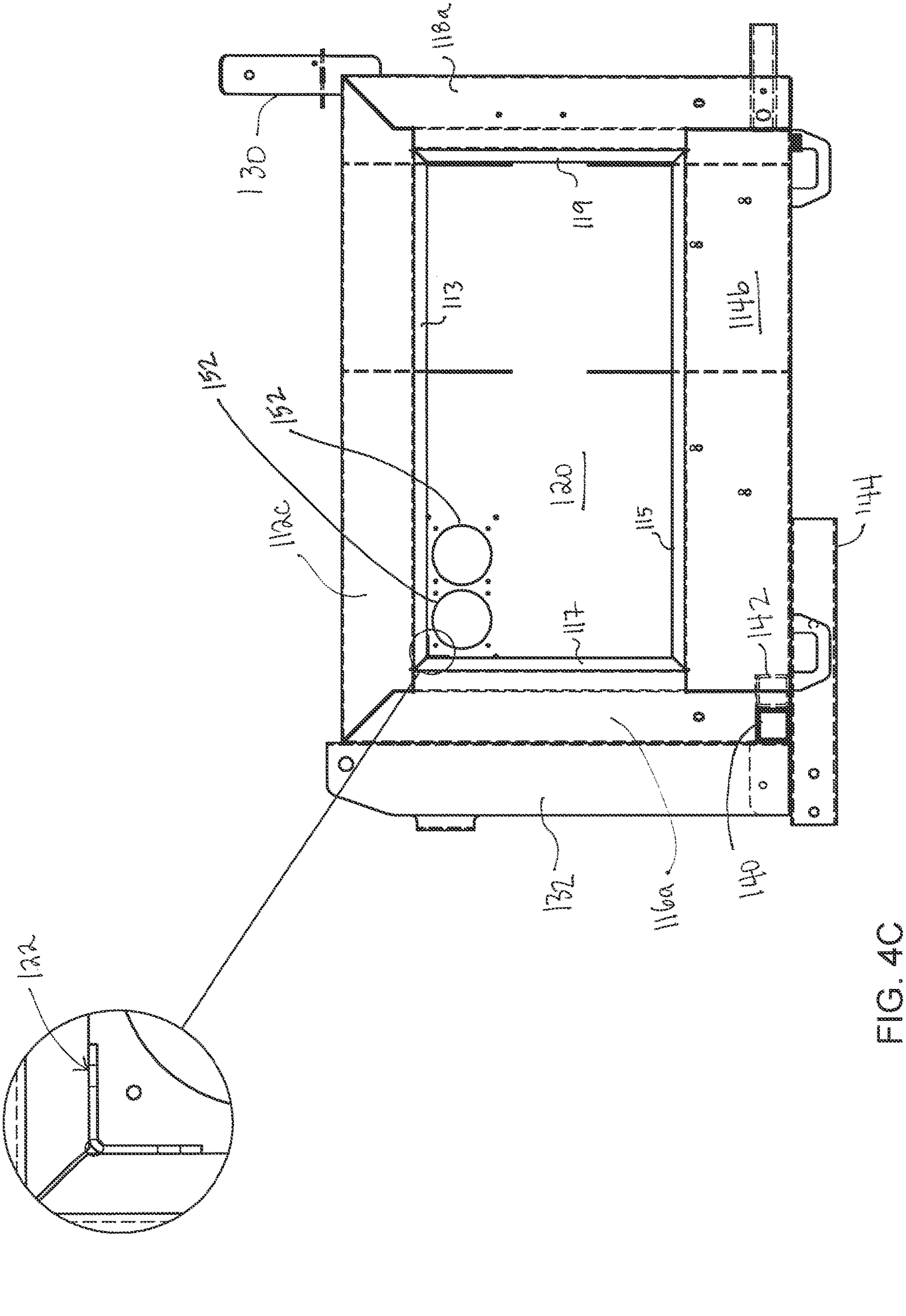
FIG. 4C is a side view of the alert assembly apparatus of FIG. 1.

The lower pan 114 includes a bottom panel 114*a* and a side panel 114*b* extending substantially perpendicularly from the bottom panel 114*a*. A flange 115 extends from an upper edge of the side panel 114*b*. The front panel 116 and the back panel 118 each include respective angled portions 116*a*, 116*b*, 118*a*, and 118*b*. The angled portions 116*a* and 118*a* include respective flanges 117 and 119, respectively. The upper pan 112, the lower pan 114, the front panel 116, and the back panel 118 are brought together and welded (or otherwise secured together) at their respective edges to form the main body 110. As shown in FIG. 4C, an opening 120 is formed in one side of the main body 110 between the second side panel 112*c*, the side panel 114*b*, and the angled portions 116*a* and 118*a* of the respective front and back panels 116 and 118. The respective flanges 113, 115, 117, and 119 may be welded together at the corners to form a continuous door stop.

A biasing member 122 may be secured to a corner of the door stop at one end, and to a door 124 at an opposing end to bias the door 124 toward and/or away from the main body 110. The biasing member 122 may be, for example, a gas spring, a helical spring, a leaf spring, a torsion spring, et cetera.

Figure 5:
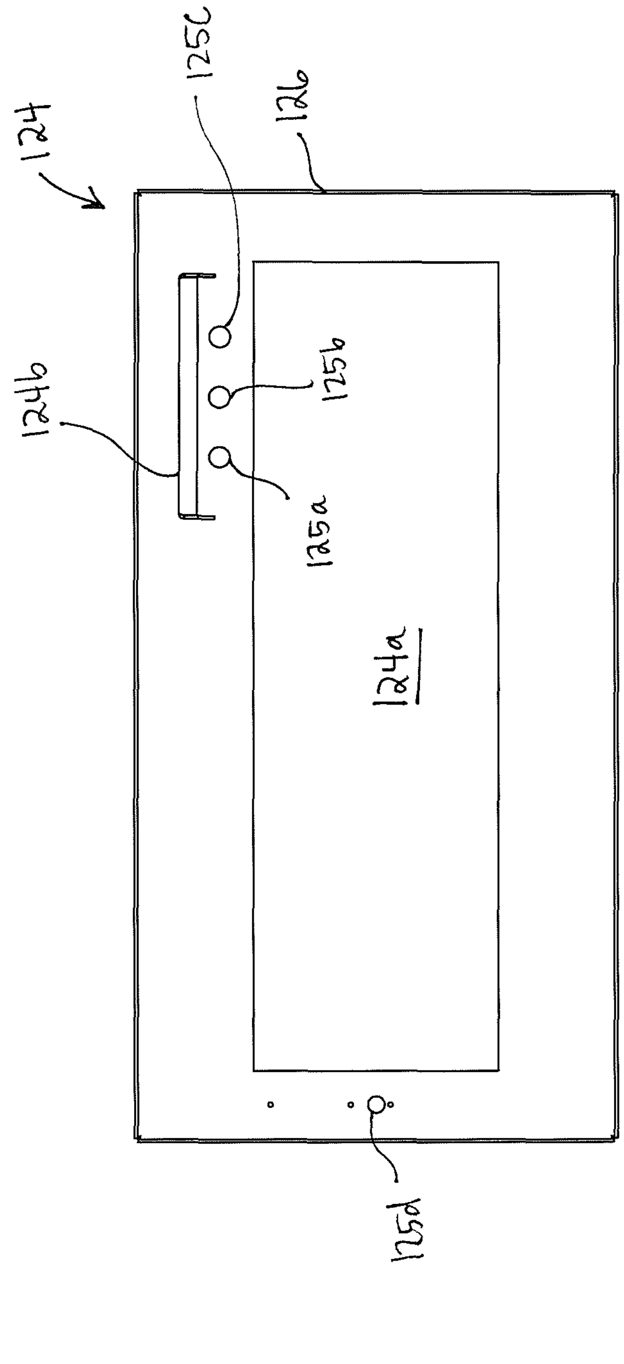
FIG. 5 is a side view of a door panel of the alert assembly apparatus of FIG. 1.

Referring now to FIG. 5, the door 124 is sized and shaped to fit within the opening 120 in the main body 110. An inner edge of the door 126 may include a seal for preventing the environment from entering the main body 110. The door 124 may include a stiffener 124*a*, and optionally a support 124*b*. The stiffener 124*a* may provide extra strength for the door 124. The support 124*b* may be configured to receive an end of the biasing member 122. Hinges attached to an inside edge of the door 124, and a respective edge of the main body 110, operably connect the door 124 to the main body 110.

Openings 125*a*, 125*b*, and 125*c* may be formed in the door 124 for receiving controls for interaction with a user. For example, control buttons 303 may partially extend through the door 124 to allow a user to activate an alert, a test alert, or to cancel the alert or test alert. The controls may be in communication with, or part of, the computing system 350, described in greater detail below. In some embodiments, a safe lock, such as an electronic safe lock or a mechanical safe lock may be attached to the door 124 to prevent unauthorized entry into the main body 110 and protect the equipment housed therein.

An opening 125*d* in the door 124 may receive a lock for locking the door 124 in the closed position.

Figure 2:
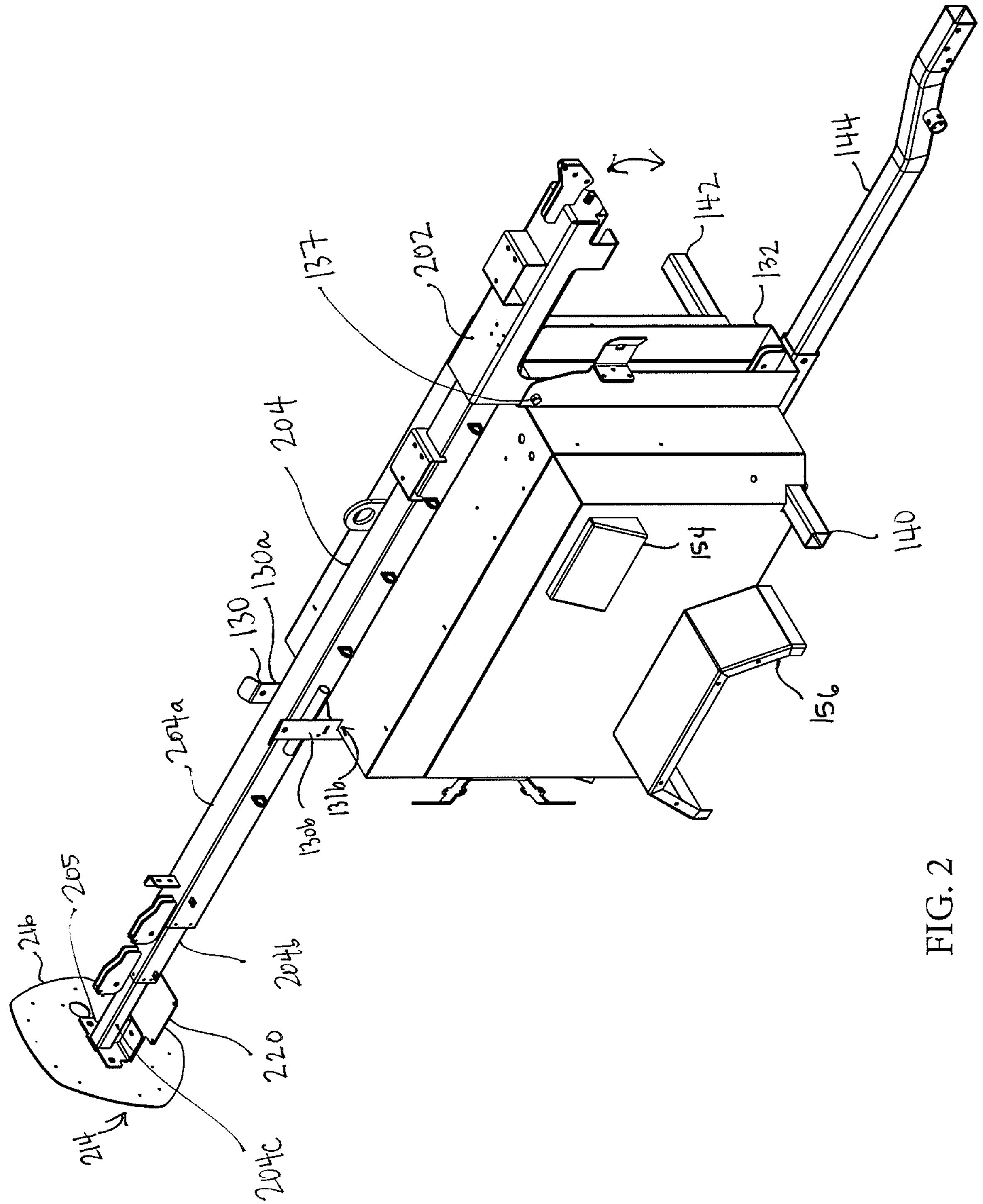
FIG. 2 is a front perspective view of the alert assembly apparatus of FIG. 1.
Figure 3:
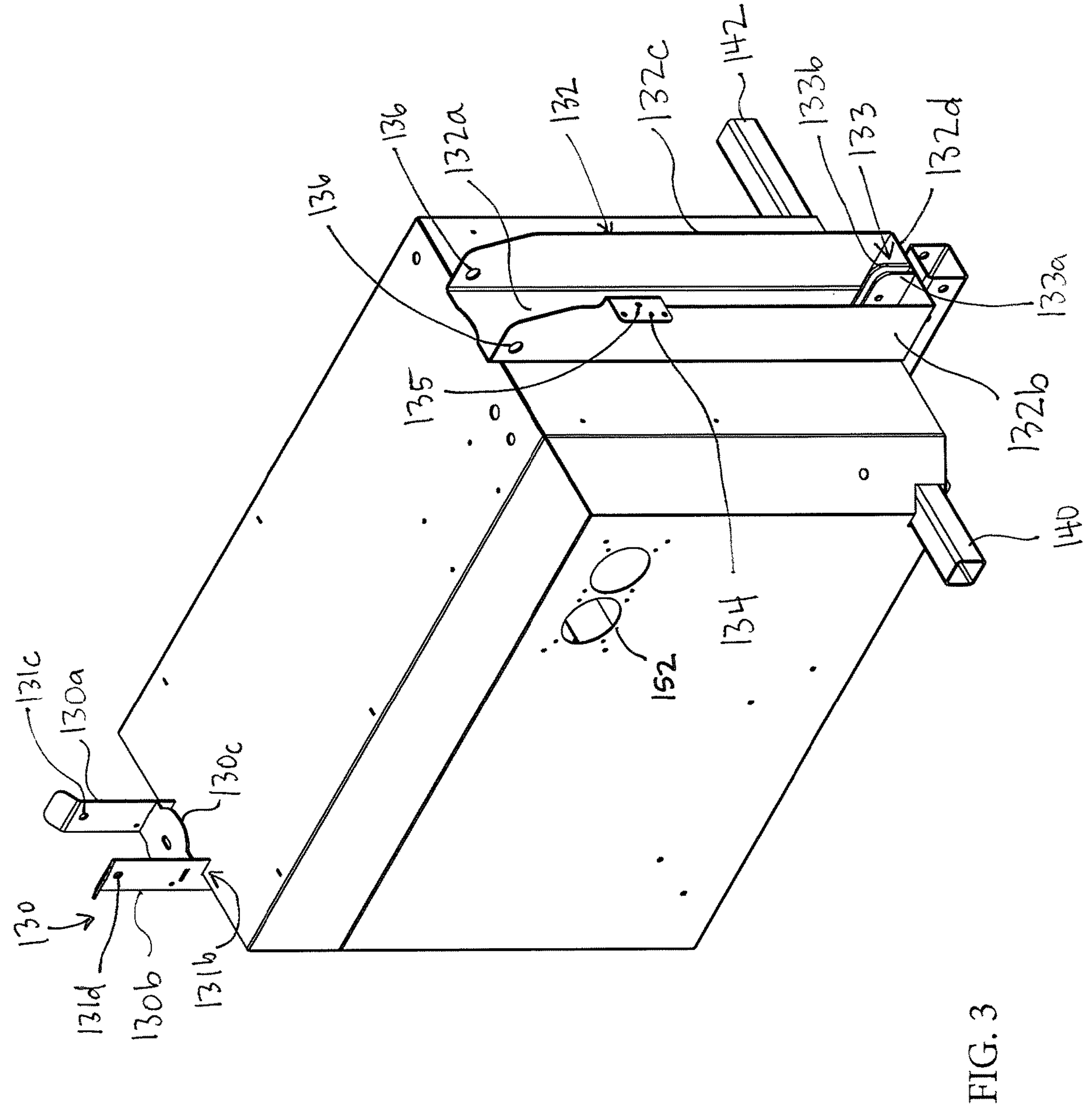
FIG. 3 is another front perspective view of the alert assembly apparatus of FIG. 1.

Referring now to FIGS. 2, 3, and 4A, tubes 140 and 142 extend laterally outwardly from a front end of the main body 110. The tubes 140 and 142 may be offset along a longitudinal axis of the main body 110. The tubes 140 and 142 each support a respective jack stand for supporting the alert assembly apparatus 105 when not in transport. In some embodiments, each jack stand may be attached to an inner tube which may be telescopically received by the respective tubes 140 and 142. Accordingly, the jack stand may be positioned away from the main body 110 in order to provide additional support to the alert assembly apparatus 105.

A third tube 144 may extend outwardly from the front end of the main body 110 along the longitudinal axis thereof. The tube 144 may engage with a hitch on a vehicle for pulling the alert assembly apparatus 105.

The main body 110 includes a plurality of brackets 130, 132 for guiding and retaining a mast assembly 200. A rear bracket 130 is positioned at a rear end of the main body 110. The rear bracket 130 includes left and right arms 130*a* and 130*b*, respectively, and a base plate 130*c* positioned between the left and right members 130*a* and 130*b*. An upper end of each of the left and right arms 130*a* and 130*b* may be angled to facilitate positioning the mast assembly 200 within the bracket 130 when in a lowered position. Each of the left and right arms 130*a* and 130*b* may include a notch 131*a* and 131*b* configured to mate with an upper edge of the main body 110. The left arm 130*a*, the right arm 130*b*, and/or the base plate 130*c* may be welded or otherwise secured to the main body 110. Openings 131*c* and 131*d* in the respective left and right arms 130*a* and 130*b* may receive a pin to lock the mast assembly 200 in position within the bracket 130 when the mast assembly 200 is in the lowered position.

A front bracket 132 functions as a mast frame for supporting the mast assembly 200 when in a raised position. The front bracket 132 is defined by a back plate 132*a*, a left support 132*b*, a right support 132*c*, and a bottom plate 132*d*. The back plate 132*a* is positioned substantially adjacent a front face of the main body 110. The front bracket 132 may be welded or otherwise secured to the front face of the main body 110.

A pulley support 133 defined by corresponding spatially separated plates 133*a* and 133*b* is situated within the front bracket 132 and is secured to the bottom plate 132*d*. The pulley support 133 may include a wheel positioned between the respective plates 133*a* and 133*b*. In embodiments, respective openings may be formed in the plates 133*a* and 133*b* for receiving a pin to secure the wheel within the pulley support 133.

A retaining plate 134 may extend from the left support 132*b* or the right support 132*c* of the front bracket 132. The retaining plate 134 has at least one aperture 135 for receiving a pin to aid in securing the mast assembly 200 in the front bracket 132. In embodiments, a pin is secured to the mast assembly 200 in a location corresponding to the opening in the retaining plate 134. When the mast assembly 200 is rotated into the raised position, the pin is extended from the mast assembly 200 through the aperture 135. The mast assembly 200 is therefore prevented from rotating back into the lowered position.

A respective opening 136 is defined in each of left support 132*b* and the right support 132*c*. A rod 137 extends through openings in a mast mount bracket 202 of the mast mount assembly 200, and through the openings 136 defined in the left support 132*b* and 132*c*. The mast mount bracket 202, which supports the mast 204, pivots about the rod 137 to allow the mast 204 to selectively move between the raised position and the lowered position.

Figure 6A:
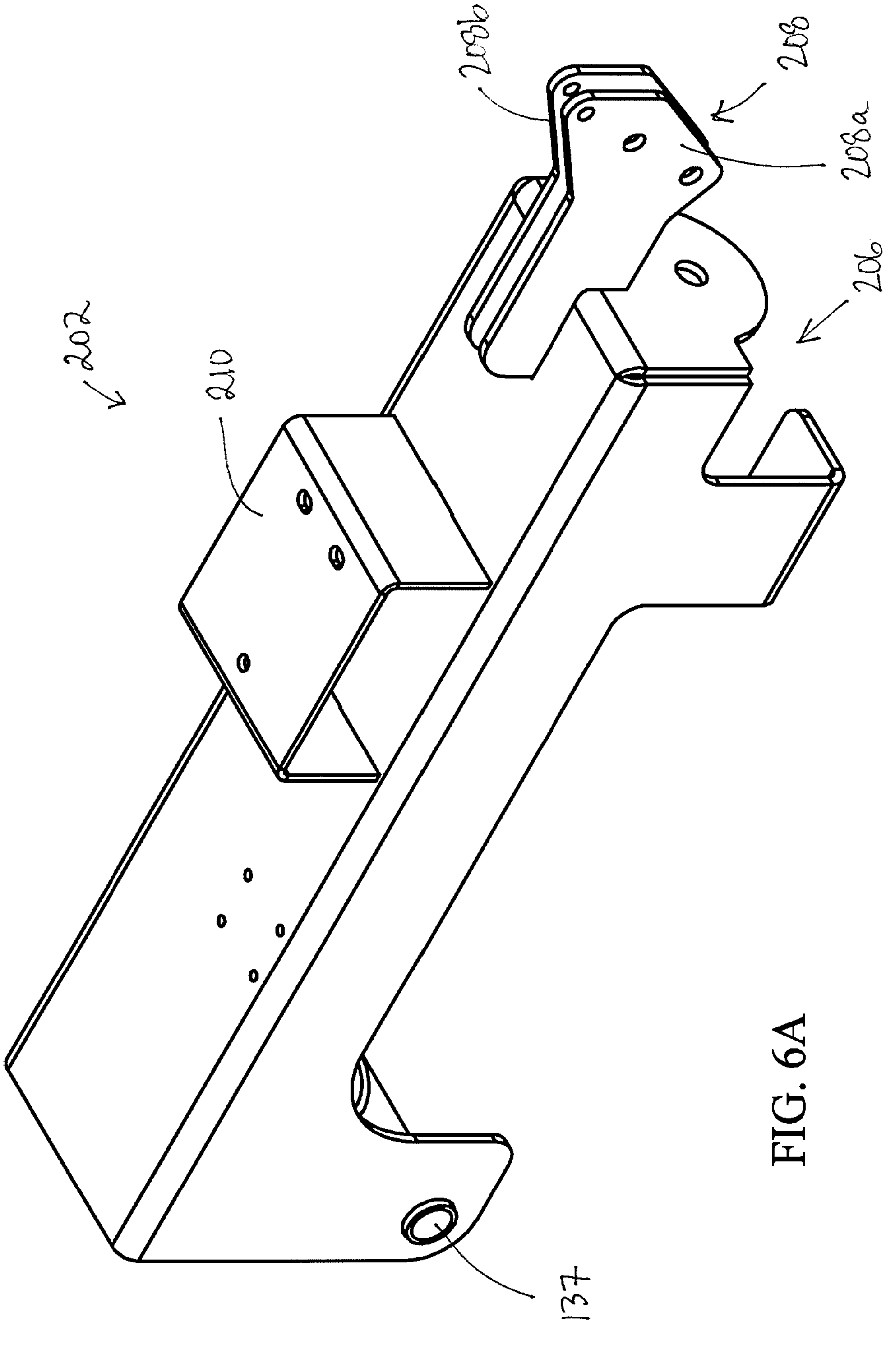
FIG. 6A is a perspective view of a mast mount bracket of an alert assembly apparatus according to embodiments of the invention.
Figure 6B:
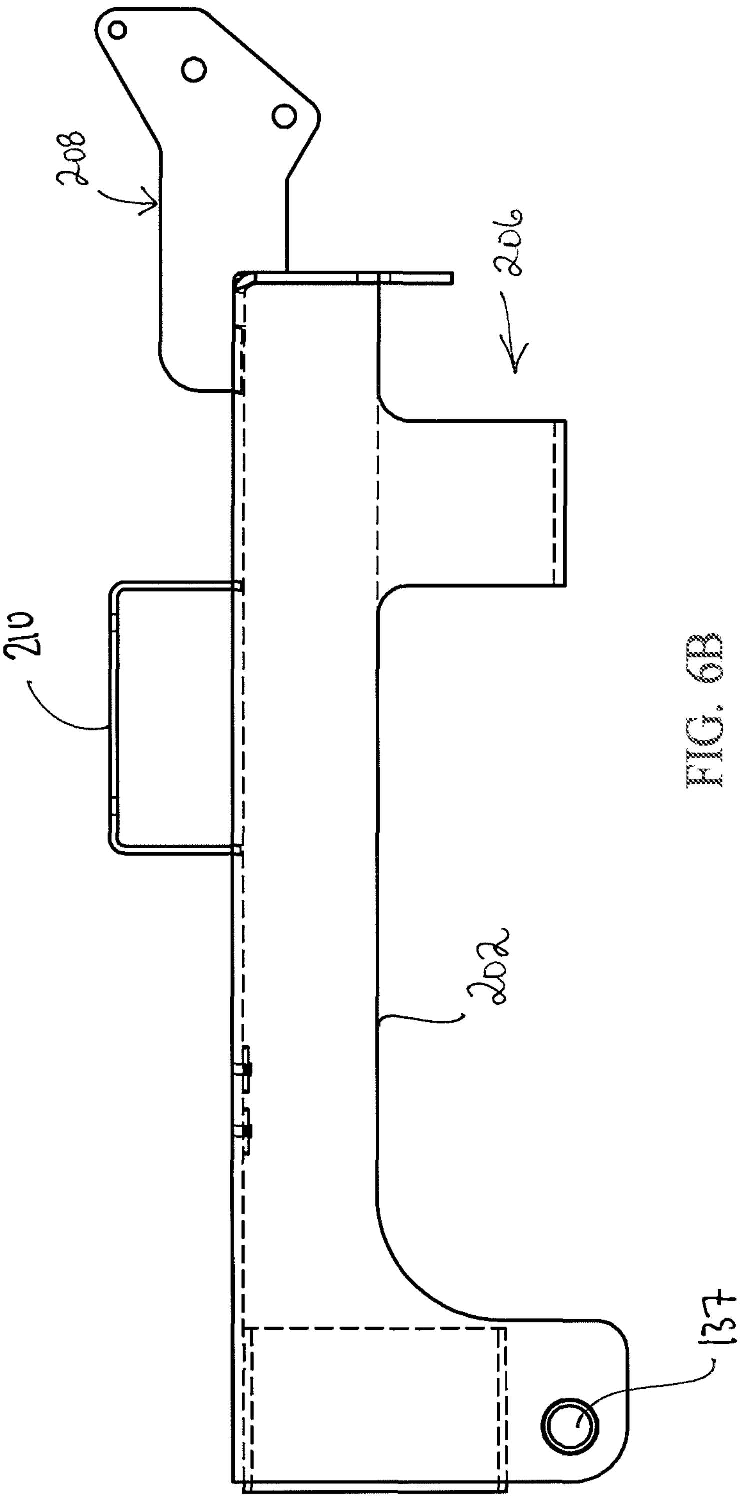
FIG. 6B is a side view of the mast mount bracket of FIG. 6A.

FIGS. 6A and 6B illustrate the mast mount bracket 202 without the mast 204. The mast mount bracket 202 has a cavity 206 for receiving the mast 204. The rod 137 is received into a proximal end of the mast mount bracket 202. A brace 208 extends from an opposing distal end of the mast mount bracket 202. The brace 208 may include a first plate 208*a* and a second plate 208*b*, and a wheel may be secured between the respective first and second plates 208*a* and 208*b* via a pin.

A winch plate 210 may be attached to a front face of the mast mount bracket 202 for supporting a winch. A drive element (e.g., rope, cable, belt, chain, etc.) may be wrapped around the winch as is known in the art. One end of the drive element may extend from the winch, wrap around the wheel of the brace 208, and the wheel of the pulley support 133. The end of the drive element may then be secured to the brace 208. Using the winch, the mast 204 may be selectively rotated between the raised and lowered positions about the pin 137.

In some embodiments, a biasing member, such as a flat spring, a helical spring, or any other biasing member may extend from the back plate 132*a*. The biasing member may allow the mast 204 to gently come to rest within the bracket 132. The biasing member may alternately, or additionally, be configured to aid in pushing the mast 204 to the lowered position. In other words, in the raised position, the mast 204 may be slightly angled past center. When the mast 204 is upright, a pin, located on the mast 204, may be inserted through the aperture 135 in the retaining plate 134 to prevent the mast 204 from unintentional movement. When the mast 204 is maintained in the raised position by the pin, the biasing member may be loaded. When the pin is removed, the biasing member may push against the mast 204 to persuade the mast 204 to rotate about the pin 137 to lay in the lowered position.

As shown in FIG. 1, the mast 204 may include one or more extension portions 204*a*, 204*b*, 204*c*. A first extension portion 204*a* may be received by the mast mount bracket 202, and may be defined by a hollow tube. A second extension portion 204*b* may be telescopically received into the first extension portion 204*a*. The second extension portion 204*b* may be defined by a hollow tube, similar to the first extension portion 204*a*. The second extension portion 204*b* may slide in and out with respect to the first extension portion 204*a*. The second extension portion 204*b* may include a mechanism, such as a ball detent, pin, or other fastening mechanism, for temporarily engaging with corresponding structure in or on the first extension portion 204*a*. Likewise, a third extension portion 204*c* may be telescopically received into the second extension portion 204*b*. The third extension portion 204*c* may slide in and out with respect to the second extension portion 204*b*. Accordingly, the third extension portion 204*c* may include a mechanism, such as a ball detent, pin, or other fastening mechanism, for temporarily engaging with corresponding structure in or on the second extension portion 204*b*.

In embodiments, the third extension portion 204*c* may be telescopically extended from the second extension portion 204*b*, while the second extension portion 204*b* remains telescopically retracted within the first extension portion 204*a*. In still other embodiments, the second extension portion 204*b* may be telescopically extended from the first extension portion 204*a*, while the third extension portion 204*c* remains telescopically retracted within the second extension portion 204*b*. In some embodiments, both the second extension portion 204*b* and the third extension portion 204*c* are extended. In further embodiments, the third extension portion 204*c* is left off of the mast 204, such that the mast 204 only includes a first extension portion 204*a* and a second extension portion 204*b*.

The first extension portion 204*a* may include a pulley mount 212. A pulley may attach to the pulley mount, and the drive element may attach to the second extension portion 204*b* and/or the third extension portion 204*c* to extend the respective extension portions 204*b* and 204*c* as desired.

Figure 7:
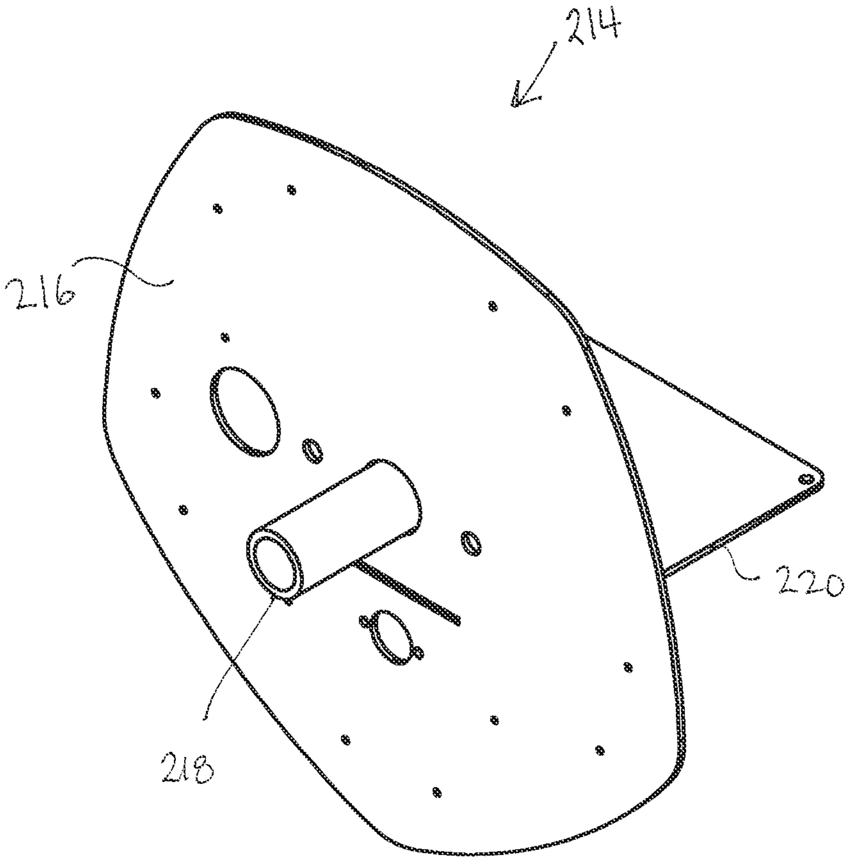
FIG. 7 is a perspective view of a light mount weld according to embodiments of the invention.

A light mount weld 214, illustrated in FIGS. 1, 2, and 7, may include a base 216, a speaker post 218, and a box mount 220. The base 216 may attach to a flange 205 of the third extension portion 204*c* (or the most external extension portion if greater or less than three extension portions are used). The base 216 may be secured with fasteners, such as rivets, screws, or any other appropriate fastener. In embodiments, the flange 205 of the third extension portion 204*c* includes at least one horizontal component and at least one vertical component. The horizontal component may be secured to the base 216. The vertical component may abut the box mount 220, and a fastener may secure the vertical component to the box mount 220. A junction box communicatively coupled to the computing system 350 may be secured to the box mount 220 for controlling the alert generating device 300.

In operation, the alert generating device 300 may indicate to one or more users an alert condition (e.g., an alert trigger from a user, a harmful environmental condition, et cetera). For example, a user may determine that an alert needs to be generated, such as in inclement weather, in a workplace emergency, or when other potentially unsafe environmental conditions are present (e.g., release of harmful chemicals). The user may then use the control buttons 303 on the alert generating device 300, the handheld alert generating device 305, and/or a remote radio device, to activate an alert via the alert generating device 300 and/or the handheld alert generating device 305. In embodiments, one of a plurality of remote radio devices may be used to activate an alert by one or more alert generating devices 300 and/or handheld alert generating devices 305.

The alert generating device 300 may include visual 302 (e.g., light) and/or audial 301 (e.g., speaker) indicators. The alert generating device 300 may include an attachment portion that engages with the speaker post 218 to temporarily secure the alert generating device 300 to the base 214. In embodiments, the attachment portion includes a tightening mechanism to fasten the attachment portion around the speaker post 218 and thus maintain the alert generating device 300 in position on the post 218. The box mount may be communicatively coupled (e.g., wired or wirelessly) to the alert generating device 300 to activate the alert (e.g., sound and/or lights). In some embodiments, the alert generating device 300 is a speaker 301 that emits a siren in response to a trigger, but is devoid of lights. Lights 302 may separately be attached to the base 216 and be operably connected to the computing system. The lights 302 may be attached to a top of and/or an underside of the base 216. When the alert generating device 300 is activated to emit a siren, the lights 302 may also be activated thus providing a visual alert indication in response to a trigger. Openings in the base 216 may be configured to receive fasteners for securing the lights 302 thereto, for example, using screws, rivets, or other appropriate fasteners.

The lights 302 may be any kind of suitable light type, such as light emitting diode, incandescent, fluorescent, halogen, metal halide, neon, high intensity discharge, low pressure sodium, electron stimulated luminescence, organic light emitting diode, a combination of the aforementioned, et cetera. The lights may be arranged in a pattern (e.g., a circle of lights). The lights may be configured to emit a specific color or sets of colors of lights, and may emit the light steadily, intermittently, in a pattern of colors, in a flashing pattern, in a fading pattern, a combination of the aforementioned, et cetera. In operation, the visual indicator 302 may receive a signal (e.g., a signal of an alert condition from the computing system 350), and activate the lights in response to the signal to indicate a user to an alert condition. For example, a plurality of lights may begin to visibly flash in response to a signal of an alert condition. In embodiments, once triggered, the visual indicator 302 remains activated for a predetermined amount of time (e.g., three minutes) before deactivation.

In embodiments, one or more lights may operate independently of an alert condition signal. For example, one or more lights may be activated (e.g., steadily or blinking) to indicate a battery level of the alert generation device.

As noted above, the alert generating device 300 may incorporate a visual indicator 302. The visual indicator 302 may include one or more displays for exhibiting images and/or sections of text. The display may include any suitable display technology, including but not limited to liquid crystals, light emitting diodes, organic light emitting diodes, electroluminescent elements, plasma elements, quantum dots, high-performance addressing, thin-film transistors, digital light processing, cathode ray tube, electronic ink, et cetera. The display may be configured to emit a specific color, sets of colors of lights, and/or images, and may emit the display steadily, intermittently, in a pattern of colors, in a flashing pattern, in a fading pattern, a combination of the aforementioned, et cetera. In some embodiments, the displays may show a message, such as instructions and/or details regarding the alert condition.

The audial indicator 301 may include one or more speakers. The speakers may be configured to emit sound in response to receiving a signal (e.g., an alert signal) from the controller. For example, the speakers may emit a siren, a recorded message, a tone, a pattern of tones, et cetera. The sound emitted in response to the received signal may be loud (e.g., preferably above 60 decibels). In operation, the speakers may indicate to a user the presence of an alert condition, such as a potentially dangerous environmental condition. In some embodiments, the audial indicator 301 may activate a siren to indicate an alert condition. In other embodiments, the audial indicator 301 may emit a message, such as instructions to evacuate the area. Once triggered, the audial indicator 301 may be configured to indicate an alarm condition for a predetermined amount of time (e.g., three minutes) before ceasing the alarm indication. In embodiments, the volume of the audio alert indicator is adjustable.

The alert generation device 300 may be any device, whether now known or later developed, for providing an alert across a sizeable area. One such alert generation device is the Ultra Electronics HyperSpike® mass notification speaker. The speaker may be configured to provide an alert having a peak sound pressure level of around 143 decibels, and a range of use of about 4 miles. Of course, other speaker systems may alternately be utilized that have different characteristics.

The alert generating device 300, when not secured to the mast assembly 200, may be stored inside the main body 110. Similarly, the computing system 350 may be housed inside the main body 110. With reference again to FIGS. 1 and 4A-B, the main body 110 may include one or more braces 150 for supporting various components of the computing system 350. Additional braces may support one or more drawers. In embodiments, the main body 110 may have two drawers. A lower drawer may be configured to store the alert generating device 300, while a top drawer is configured to store other portions of the system, such as the handheld alert generating devices, batteries, et cetera. Of course, the upper drawer may store the alert generating device 300 while the lower drawer stores other portions of the system.

The main body 110 may house other electric components, such as a power supply connection and/or a battery.

In embodiments, the alert assembly apparatus 105 may be transported on a trailer or other transportation device. Accordingly, to prevent the alert assembly apparatus 105 from undesirably moving, tie downs 152 may extend from the lower pan 114 for securing the alert assembly apparatus 105 to the trailer, e.g., via a chain, rope, etc. In some embodiments, the alert assembly apparatus 105 may be towable like a trailer as described above.

Further, to prevent overheating of the computing system 350, the main body 110 may include one or more openings 152 to vent warm air from inside the main body 110 and/or to pull cool air into the main body 110. In embodiments, the openings 152 may be covered with a vent weld 154. In some embodiments, thermostatically-controlled fans may be positioned within the openings for cooling the system 350.

Figure 8:
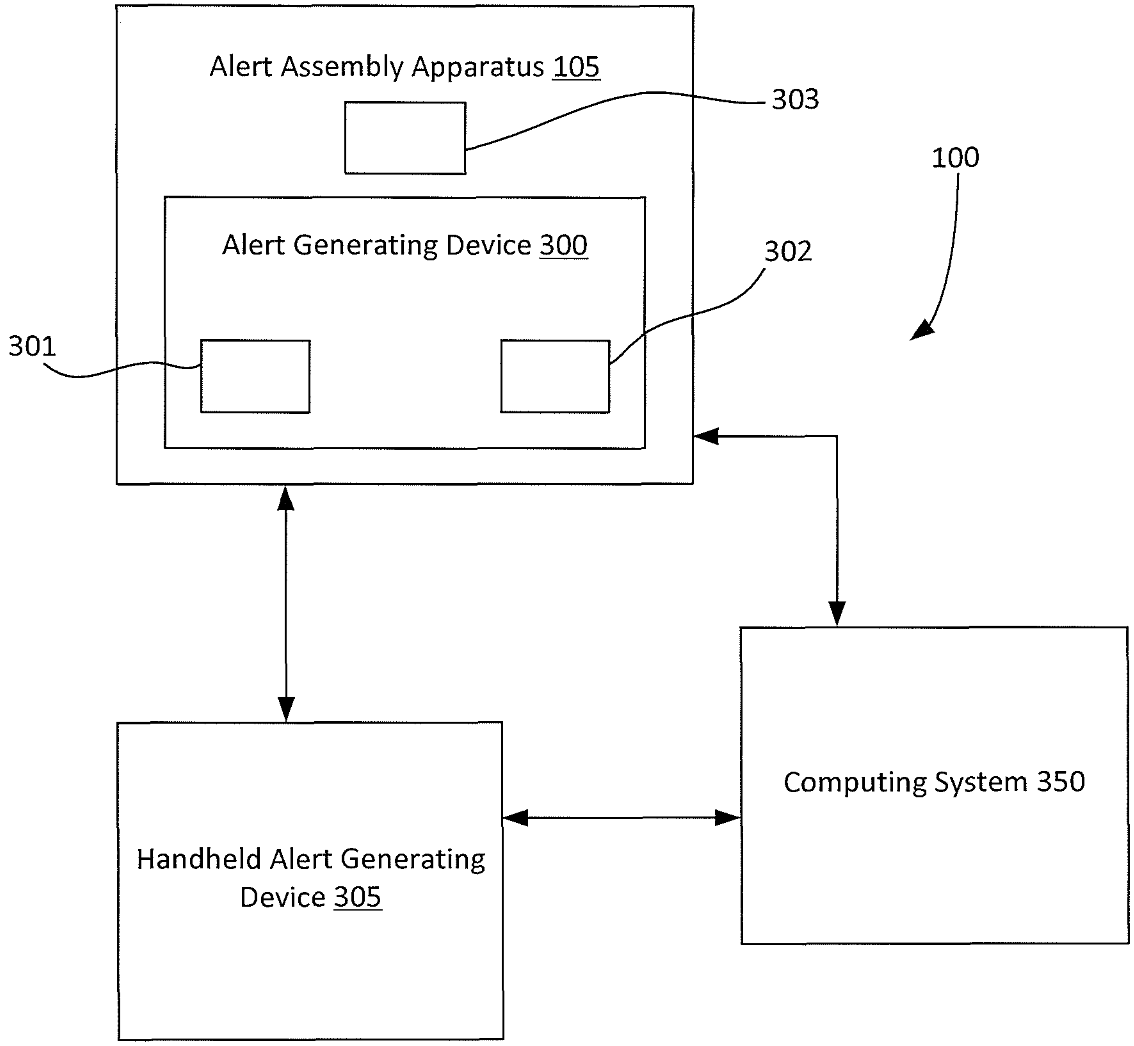
FIG. 8 is a functional block diagram of an alert system according to various embodiments of the invention.
Figure 9:
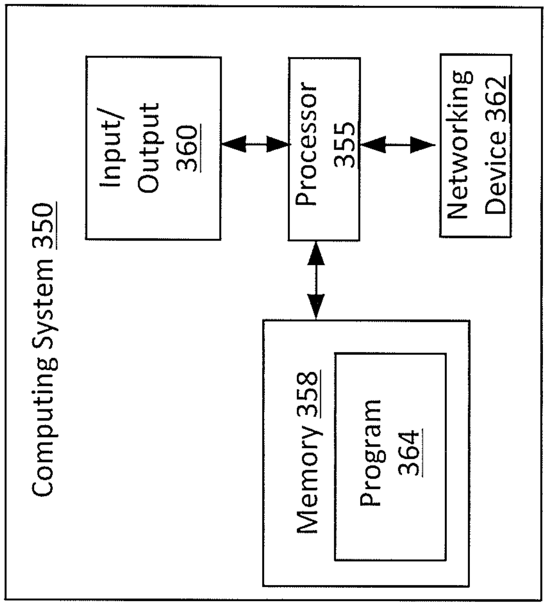
FIG. 9 is a functional block diagram of a computing system of an alert generation system in accordance with various embodiments of the invention.

The main body 110 may additionally include a fender 156 extending from either side 112*b*, 114 thereof Moving on, as mentioned above, the computing system 350 may be housed partly or entirely inside the alert assembly apparatus 105. As illustrated in FIG. 8, the computing system 350 is communicatively coupled to the alert assembly apparatus 105 and/or one or more alert generating devices 305. FIG. 9 is a functional block diagram of the computing system 350 which may be used to implement the various alert generation system embodiments according to the different aspects of the invention. The computing system 350 may be, for example, a smartphone, a laptop computer, a desktop computer, a flexible circuit board, or other computing device whether now known or subsequently developed. The computing system 350 may include a processor 355, memory 358, an input and/or output device 360, and a networking device 362. The processor 355 may include any processor used in smartphones and/or other computing devices, including an analog processor (e.g., a Nano carbon-based processor). In certain embodiments, the processor 355 may include one or more other processors, such as one or more microprocessors, and/or one or more supplementary co-processors, such as math co-processors.

The memory 358 may include both operating memory, such as random access memory (RAM), as well as data storage, such as read-only memory (ROM), hard drives, optical, flash memory, or any other suitable memory/storage element. The memory 358 may include removable memory elements, such as a CompactFlash card, a MultiMediaCard (MMC), and/or a Secure Digital (SD) card. In certain embodiments, the memory 358 includes a combination of magnetic, optical, and/or semiconductor memory, and may include, for example, RAM, ROM, flash drive, and/or a hard disk or drive. The processor 355 and the memory 358 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing.

The networking device 362 may be configured to handle communication links between the computing system 350 and other external devices or receivers (e.g., radios, handheld alert generating devices 305, sensors (such as gas sensors), etc.), and to route incoming/outgoing data appropriately. The networking device 362 may include one or more transceiver modules configured for transmitting and receiving data, and using, for example, one or more protocols and/or technologies, such as Bluetooth, radio, GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology whether now known or later developed.

The memory 358 may store instructions for communicating with other systems. The memory 358 may store, for example, one or more programs (e.g., computer program code) adapted to direct the processor 355 in accordance with the embodiments described herein. The instructions also may include program elements, such as an operating system. While execution of sequences of instructions in the program causes the processor 355 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 358 includes software 364. The software 364 may contain machine-readable instructions (e.g., a mobile phone application) configured to be executed by the processor 355. The software 364 may, for example, process user inputs to the computing system 350. In embodiments, the software 364 may cause the computing system 350 to dynamically respond to a signal from the input/output device 360, such as the push of an alert condition button. For example, the software 364 may have the computing system 350 modify the function of the audial indicator 301 and/or visual indicator 302 based upon the received signal, as described previously. In some embodiments, the software 364 may cause the computing system 350 to dynamically respond to a signal from an input/output device 360 configured as a sensor, such as a gas detector or lightning detection system. If the gas detector determines the presence of a gas above a predetermined threshold, the computing system 350, via the software 364 and the processor 355, may automatically activate the audial indicator 301 and/or the visual indicator 302 to alert nearby workers of harmful conditions. Or, if the lightning detection system detects lightning within a predetermined threshold distance of the work area, the computing system 350, via the software 364 and the processor 355, may automatically activate the audial indicator 301 and/or the visual indicator 302 to alert nearby workers of potentially imminent hazardous conditions. In some embodiments, the sensor 360 may form a part of the computing system 350. In other embodiments, the sensor 360 may be separate from the computing system 350, but may be communicatively coupled thereto.

It shall be understood that the input/output device 360 may include one or more input/output devices. As described immediately above, the input/output device 360 may be one or more buttons that allows a user to interface with the computing system 350. In some embodiments, the input/output device 360 may be a sensor or detection system communicatively coupled to the computing device 350. In still other embodiments, the input/output device 360 may include a radio, keyboard, a mouse, a stylus pen, buttons, knobs, switches, and/or any other device that may allow a user to provide an input to the system 100 via the computing device 350. In some embodiments, the input/output device 360 may comprise a media port (such as a USB port, or a SD or microSD port) to allow for media (e.g., a USB drive, a SD or microSD drive, laptop memory, smart phone memory, etc.) to be communicatively coupled to the computing device. The input/output device 360 may include one or more visual indicators 302 (e.g., a display), audible indicators (e.g., speakers), or any other such output device now known or subsequently developed. In some embodiments, at least a part of the input/output device 360 may be separated from at least another part of the input/output device 360. For example, a keyboard and a display screen may be separate components of the input/output device 360. A user may functionally interact with the system 100 via the input/output device 360.

In embodiments, the input/output device(s) 360 may be configured to control the function of the audial 301 and/or visual 302 indicators, such as by toggling power to the indicators, changing the color of the visual indicator 302, changing a blinking pattern of the visual indicator 302, changing the tone of the audial indicator 301, changing a tone pattern of the audial indicator 301, et cetera. The input/output device(s) 360 may additionally control the function of the handheld alert generator 305.

Figure 10:
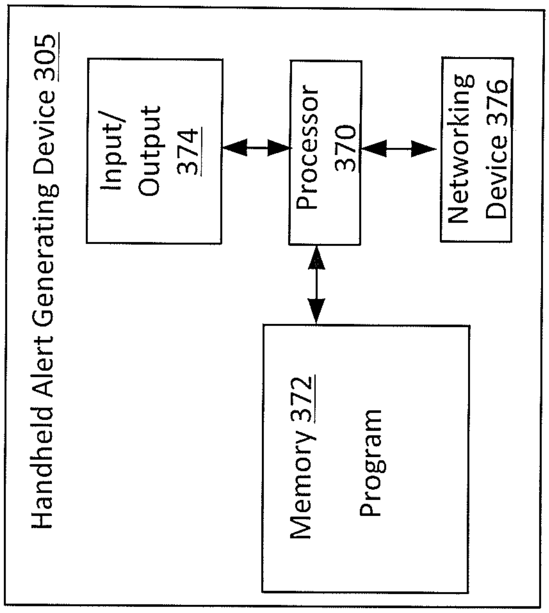
FIG. 10 is a functional block diagram of a handheld alert generating device of an alert generation system in accordance with various embodiments of the invention.

The handheld alert generator 305 may be, for example, a handheld personal alert device. As shown in FIG. 10, the handheld alert generating device 305 may include a processor 370, memory 372, an input and/or output device 374, and a networking device 376, along with other standard electronic components (e.g., wires, a battery, et cetera). The processor 370, memory 372, input and/or output device 374, and networking device 376 may be substantially similar to the processor 355, memory 358, input and/or output device 374, and networking device 362 except as is described herein or as would be inherent. In embodiments, the handheld alert generating device 305 is in data communication with the alert generating device 300, the computing system 350, one or more radios, and/or other handheld alert generating devices 305.

The input/output device 374 of the handheld alert generating device 305 may include one or more displays which may be configured to activate lights, images, and/or sections of text for a user to read. The display may be any suitable display type, such as liquid crystal, light emitting diode, organic light emitting diode, electroluminescent, plasma, quantum dot, high-performance addressing, thin-film transistor, digital light processing, cathode ray tube, electronic ink, et cetera. The display may be configured to show a specific color, sets of colors of lights, and/or images, and may emit the light steadily, intermittently, in a pattern of colors, in a flashing pattern, in a fading pattern, a combination of the aforementioned, et cetera. In some embodiments, the displays may show a message, such as instructions and/or details regarding the alert condition.

In embodiments, the input/output device 374 may include one or more audial speakers. The speakers may be configured to emit sound in response to receiving a signal (e.g., an alert signal) from the alert generating device 300 and/or the computing system 350. For example, the speakers on the handheld alert generating device 305 may emit a siren, a recorded message, a tone, a pattern of tones, et cetera. The sound emitted in response to the received signal may be loud (e.g., above 60 decibels). In operation, the speakers of the handheld alert generation device 305 may indicate to a user the presence of an alert condition, such as a potentially dangerous environmental condition, when the user is far from the alert generating device 300. In embodiments, once triggered, the audial indicator 301 may be configured to indicate an alarm condition for a predetermined amount of time (e.g., three minutes) before ceasing the alarm indication. In embodiments, the volume of the speakers is adjustable.

In some embodiments, the handheld alert generating device 305 may vibrate upon receipt of an alert signal from the computing system 350. Thus, a person wearing the handheld alert generating device 305 may be alerted to the unsafe condition even if he is unable to see visual indicators or hear audial indicators.

In some embodiments, one or more sensors, such as a gas detector or a lightning detection sensor may be distributed over a working area. The sensors may be configured to send a signal to one or more handheld alert generating devices 305 that are within a predetermined distance threshold from the sensor. The handheld alert generating devices 305 may activate an alert as described above. Additionally, in some embodiment, the handheld alert generating devices 305 may send a signal to the computing system 350 to activate an alert via the alert generating device 300, and any handheld alert generating devices 305 that are not within the distance threshold. In some embodiments, the sensor may send a signal to a nearby handheld alert generating device 305 to alert the user of the potentially hazardous condition. The user of the handheld alert generating device 305 may subsequently engage with the input/output device 360 of the computing system 350 or a radio device to generate further alerts via the alert generating device 300 and/or the handheld alert generating devices 305.

It shall be understood that the sensors described herein are exemplary only. The gas detector may be any gas detector now known or later developed. Similarly, the lightning detection system may be any such system now known or later developed. One such lightning system may be a lightning detection system manufactured by Boltek™. Other sensors may additionally, or alternately, be included as part of the system 100. For example, in some areas, high winds may be a concern. Accordingly, an anemometer may be used for identifying wind speeds outside of a certain threshold. Or, proximity sensors may be disposed in restricted areas. Alerts may be activated if a person is inside the restricted area. Of course, other sensors may be utilized as well to provide information to the system 100 as is necessary and desirable.

Figure 11:
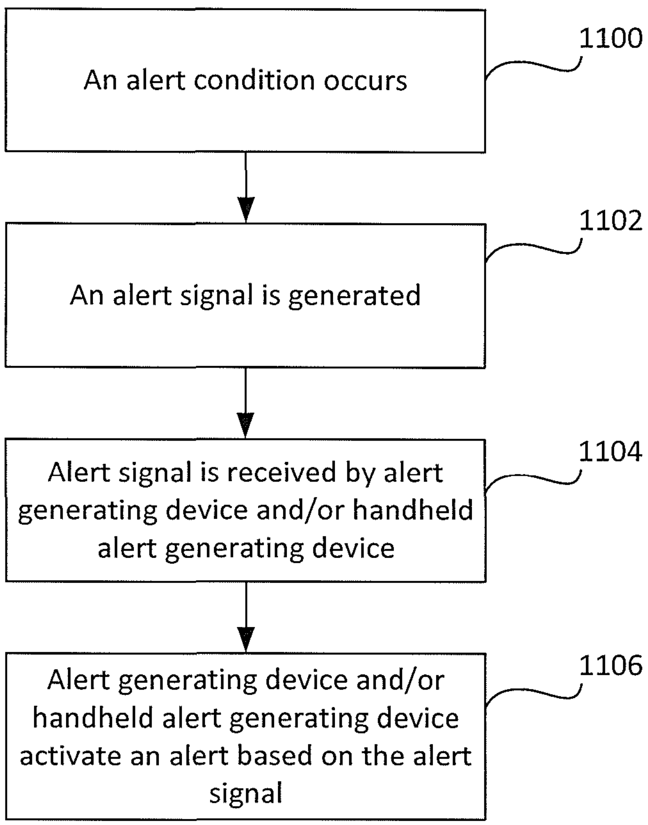
FIG. 11 is a flow chart of a method of activating an alert generating device according to embodiments of the invention.

A method of operating the alert generation system is shown in FIG. 11. At step 1100, an alert condition occurs. For example, the alert condition may be an emergency that is dangerous to those in proximity to the alert generation device 300, impending dangerous weather, potentially unsafe environmental conditions, et cetera. At step 1102, a user may activate an alert signal by engaging with the input/output device 360 of the computing system 350. In some embodiments, the alert signal may be activated by a user engaging with the input/output device 374 of the handheld alert generating device 305. In other embodiments, the alert signal may be automatically sent from, for example, one or more sensors distributed in an area and communicatively coupled to the alert generating device 300, the handheld alert generating device 305, and/or computing system 350. In still other embodiments, a user may engage with a radio device for activating the alert on the alert generating device 300 and/or the handheld alert generating device 305. Next, at step 1104, the alert generating device 300 and/or the handheld alert generating device 305 may receive the alert signal. The alert signal may be alternately or additionally routed through the computing system 350. The computing system 130 may, for example, use software to determine a modification to the operation of the alert generating device 300 and/or the handheld alert generating device 305. The alert generating device 300 and/or the handheld alert generating device 305 may be directed to indicate to a user the alert condition at step 1106. For example, the audial indicator 301 may be directed to emit a sound, the visual indicator 302 may be directed to emit light, and/or the handheld alert generating device 305 may be directed to emit sound and/or light, as described previously.

It is to be understood that the steps of the method described herein may be modified and that additional steps may be included. For example, the method may include the step of sending a cancelation signal, via a handheld alert generating device 305 and/or the computing system 350, causing the alert generating device 300 and/or the handheld alert generating device 305 to deactivate the alarm.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be carried out in the specific order described.

What is claimed is:

1. An alert generation system, comprising:

a mobile alert assembly apparatus;

an alert generating device comprising an audial indicator and a visual indicator at one end;

a handheld alert generating device comprising a second audial indicator;

a sensor; and a computing system in data communication with the alert generating device, the handheld alert generating device, and the sensor;

wherein:

the alert generating device is selectively disposed atop a mast, the mast being operably connected to the mobile alert assembly apparatus and configured to rotate between an operational configuration and a storage configuration;

the mobile alert assembly apparatus has a locking pin configured to secure the mast into one of the operational configuration and the storage configuration;

the computing system sends a signal to the alert generating device based on a determination of a harmful environmental condition by the sensor;

the alert generating device activates an alert via at least one of the audial indicator and the visual indicator, in response to the signal;

the computing system determines whether to send an alert signal to the handheld alert generating device based on a location of the handheld alert generating device relative to the sensor; and if the handheld alert generating device receives the alert signal, the handheld alert generating device activates a second alert via the second audial indicator.

2. The system of claim 1, wherein the audial indicator comprises a speaker system.

3. The system of claim 2, wherein the visual indicator comprises a light.

4. The system of claim 1, wherein the computing system is housed in the mobile alert assembly apparatus.

5. The system of claim 1, wherein a first end of the mast is secured to a mast mount bracket, the mast mount bracket being rotatably linked to the mobile alert assembly apparatus.

6. The system of claim 5, wherein:

a second end of the mast comprises an L-shaped bracket;

a mount weld, comprising a plate and a box mount secured to one side of the plate, is secured atop the mast by fastening the box mount to the L-shaped bracket; and the alert generating device is situated atop the mount weld and secured thereto.

7. The system of claim 1, wherein the mast comprises a first section in telescopic communication with a second section.

8. The system of claim 7, wherein the first section of the mast is secured to a mast mount bracket, the mast mount bracket being rotatably linked to the mobile alert assembly apparatus.

9. The system of claim 8, wherein the mobile alert assembly comprises a corresponding bracket, the mast mount bracket being rotatably linked to the corresponding bracket via a rod; and wherein a pin is inserted through a retaining plate of the corresponding bracket and a corresponding opening in the first section of the mast to maintain the mast in the operational configuration.

10. The system of claim 9, wherein:

a second bracket is disposed at a side of the alert assembly apparatus opposite the corresponding bracket;

the second bracket extends upwardly beyond a top edge of the alert assembly apparatus;

the first section of the mast is received by the second bracket when in the transportation configuration, the mast being retained in the second bracket by a locking mechanism.

11. The system of claim 8, wherein the mast mount bracket comprises a pulley mount and a pulley secured to the pulley mount, wherein the pulley is operational to rotate the mast between the operational configuration and the storage configuration.

12. The system of claim 11, wherein the first section of the mast comprises a second pulley mount and a second pulley secured to the second pulley mount, wherein the second pulley is operational to telescopically extend and retract the second section of the mast in relation to the first section of the mast.

13. The system of claim 7, wherein the first section of the mast comprises a pulley mount and a pulley secured to the pulley mount, wherein the pulley is operational to telescopically extend and retract the second section of the mast in relation to the first section of the mast.

14. The system of claim 1, wherein the alert assembly apparatus comprises a pair of laterally offset hollow tubes extending across a front side thereof, and wherein each of tubes is configured to telescopically receive an arm for supporting a jack stand.

15. The system of claim 14, wherein the alert assembly apparatus comprises at least one drawer configured to hold the alert generating device when the alert generating device is not disposed atop the mast.

16. The system of claim 1, wherein the sensor is a gas detector.

17. The system of claim 1, wherein the sensor is a lightning detection system.

18. The alert generation system of claim 1, wherein the computing system determines to send the alert signal to the handheld alert generating device if the location of the handheld alert generating device is within a vicinity of the sensor such that an imminent hazardous condition to a person is potentially present.

19. A method of providing an alert to a working area, comprising:

providing a mobile alert assembly apparatus at the working area, the mobile alert assembly apparatus comprising:

a housing;

a mast rotatably secured to the housing;

a locking pin configured to engage with the mast;

an alert generating device configured to be temporarily secured to an end of the mast;

at least one remote alert generating device temporarily stored inside the housing; and a computing system stored inside the housing and communicatively coupled to the alert generating device and the remote alert generating device; the computing system comprising a processor and memory having instructions for providing an alert to a user via at least one of the alert generating device and the remote alert generating device;

upon arrival at the working area, removing the alert generating device from the housing and securing the alert generating device to the end of the mast;

rotating the mast into an operational configuration;

locking the mast into an operational configuration via the retention mechanism;

determining, via the programming of the computing system, a harmful environmental condition;

sending, via the processor, an alert signal to the alert generating device;

activating an alert on the alert generating device in response to the alert signal;

determining a distance between a sensor associated with the harmful environmental condition and the remote alert generating device;

sending a signal to the remote alert generating device if the distance between the sensor and the remote alert generating device is such that there is a potentially hazardous condition associated with the remote alert generating device; and activating an alert on the remote alert generating device in response to the remote alert generating device receiving the signal.

* * * * *